United States Patent [19]

Dian

[11] 4,038,878

[45] Aug. 2, 1977

[54] BICYCLE DERAILLER

[75] Inventor: Walter Dian, Downers Grove, Ill.

[73] Assignee: Beatrice Foods Co., Elgin, Ill.

[21] Appl. No.: 687,294

[22] Filed: May 17, 1976

[51] Int. Cl.² .......................... F16H 7/22; F16H 11/08
[52] U.S. Cl. ........................................ 74/217 B; 74/242
[58] Field of Search ............................ 74/217 B, 242

[56] References Cited

U.S. PATENT DOCUMENTS

| 3,730,012 | 5/1973 | Juy | 74/217 B |
| 3,890,847 | 6/1975 | Dian | 74/217 B |
| 3,903,751 | 9/1975 | Dian | 74/217 B |

Primary Examiner—Samuel Scott
Assistant Examiner—Allan R. Burke
Attorney, Agent, or Firm—Hill, Gross, Simpson, Van Santen, Steadman, Chiara & Simpson

[57] ABSTRACT

A bicycle derailler which provides for an actuating mechanism which prevents stretching and breaking of the actuating cable by allowing an actuating link to move when the cable is tightened at times when the wheels of the bicycle are not moving. Under these conditions, when the actuating link is moved by the cable it spring biases the derailler mechanism such that when the bicycle starts to move the spring bias causes shifting of the derailler.

9 Claims, 8 Drawing Figures

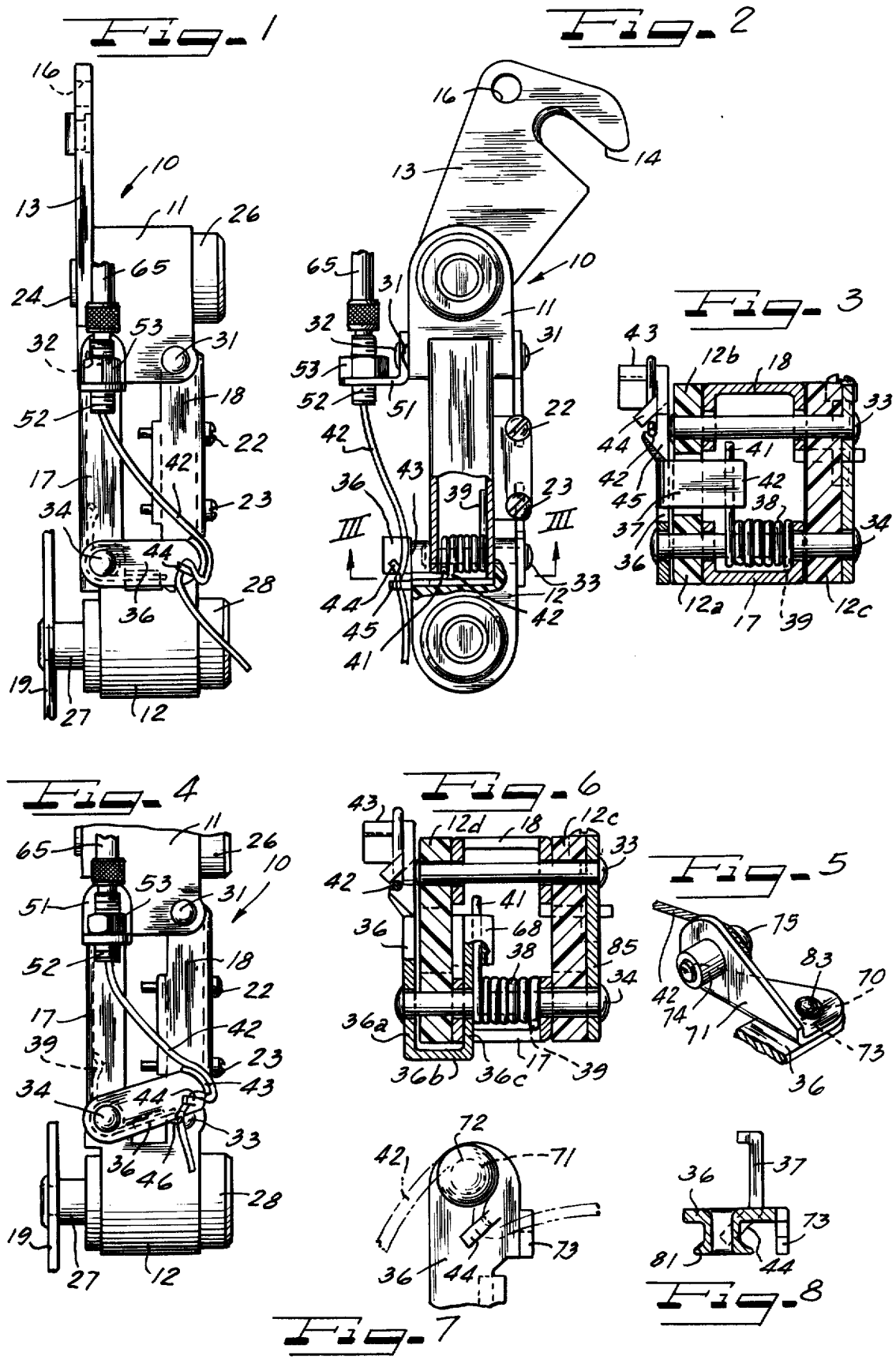

BICYCLE DERAILLER

CROSS REFERENCE TO RELATED APPLICATIONS

This application is related to application Ser. No. 631,529 filed Nov. 13, 1975 entitled "Derailler Construction".

BACKGROUND OF THE INVENTION

1. Field of the Invention

This invention relates in general to bicycle deraillers and in particular to an improved derailler structure.

2. Description of the Prior Art

Bicycle derailler mechanisms are actuated by cables and the movement of the cable while the wheels of the bicycle are not rotating causes stretching or breaking of the cable. Although the instructions furnished with the bicycle instruct the user to not move the cable when the wheels are not moving, operators can forget such instruction and stretch or break the cable by moving it.

SUMMARY OF THE INVENTION

The present invention provides an improved derailler construction which allows the shifting cable of the bicycle to be moved without breaking or stretching the cable. The cable is connected to a spring loaded lever which is also the return spring for derailler such that if the cable is moved while the wheels of the bicycle are not turning, the lever can move against a spring without breaking or stretching the cable and when the bicycle starts movement the spring tension will cause shifting of the derailler mechanism thus preventing breakage and stretching of the cable.

The invention also provides a quick connect and disconnect arrangement for attaching the cable to the shifting lever.

A second embodiment of the invention provides a shifting lever which engages one end of the spring.

Other objects, features and advantages of the invention will be readily apparent from the description of certain preferred embodiments thereof taken in conjunction with the accompanying drawings although variations and modifications maybe effected without departing from the spirit and scope of the novel concepts of the disclosure, and in which:

BRIEF DESCRIPTION OF THE DRAWINGS

FIG. 1 is a plan view of the invention;

FIG. 2 is a plan view of the invention at right angles to FIG. 1;

FIG. 3 is a sectional view taken on line III—III from FIG. 2;

FIG. 4 is a partial plan view illustrating the shifting lever in a rotated position;

FIG. 5 is a partially cut-away view of the cable connecting mechanism as modified;

FIG. 6 is a sectional view illustrating a modification of the invention;

FIG. 7 illustrates a modification of the cable locking mechanism; and

FIG. 8 illustrated a further modification of the cable locking mechanism.

DESCRIPTION OF THE PREFERRED EMBODIMENTS

The novel derailler 10 of the invention is illustrated in the Figures and comprises a first embodiment illustrated in FIGS. 1 through 4 which as a pair of main deraillers member 11 and 12 which are connected by links 17 and 18 pivotally attached to the members 11 and 12 by pins 31, 32, 33 and 34. A mounting bracket 13 is connected to the main derailler member 11 by shaft 24 and has a pin 16 which extends therefrom opposite a slot 14 that is received over the axle of the bicycle. A nut not shown is mounted on the axle of the bicycle and locks the derailler 10 to the bicycle.

The lower main derailler member 12 carries a shaft 27 that supports the roller cage 19 of the derailler mechanism.

Cover members 26 and 28 cover shaft ends 24 and 27.

A cable 42 passes through a cable guide 52 which is held by a screw 53 to a bracket 51 mounted on shaft 32 which passes through member 11 and link 17. The end of cable 42 passes over an arcuate shaped member 43 of an actuating link 36. After the cable passes over the arcuate portion 43, it is hooked under projection 44 and into a notch 46 best shown in FIG. 4 of the actuating link 36. The arcuate portions 45 and 43, projection 44 and notch 46 lock the cable end to the actuating link 36 and allow a fast method of connecting or disconnecting the cable when adjustment of the cable is to made.

The actuating link 36 is pivotally supported on the shaft 34 which pivotally connects the link 17 to the main derailler member 12. As best shown in detail breakaway FIG. 4 the link 36 has an arcuate portion 43 and a projection 44 and a notch 46. This structure is to allow the end of the cable 42 to be firmly attached to the operating arm 36 by passing the cable 42 over the arcuate portion 43 under the projection 44 and into the notch 46 as shown in FIG. 4, for example.

As best shown in FIG. 3, the operating link 36 has a transverse projection 37 which fits between the links 17 and 18 as shown in FIG. 4. As shown in detail FIG. 3, the lower main derailler member 12 is attached to the links 17 and 18 and the projection 37 of the actuating member 36 extends between the portions 12a and 12b of member 12 and one end 41 of a coil spring 38 engages the end 42 of the projection 37. The coil spring 38 fits around pin 34 and has its other end 39 against the link 17 as shown in FIG. 3.

The derailler is actuated by pulling on the cable 42 from the operating level, not shown, which passes through the cable cover 65 and when the cable 42 is not under tension the derailler is in the position shown in FIG. 1. When it is desired to shift gears the cable 42 is moved upwardly relative to FIG. 1 and if the wheels of the bicycle are turning at the time that the cable is moved the operating link 36 will cause the links 17 and 18 to pivot counterclockwise relative to FIG. 1 and the roller cage 19 of the derailler will cause the chain to move from one sprocket to another sprocket in a conventional manner. However, if the wheels of the bicycle are not moving at the time tension is applied to the cable 42 the chain of the bicycle will lock the roller cage 19 so that it cannot move counterclockwise relative to FIG. 1 and without the provision of the present invention the cable 42 would be stretched or broken. With the present invention the link 36 can move as shown in FIG. 4 when the roller cage 19 is held. In this circumstance, The link 36 will move counterclockwise to the position shown in FIG. 4 but the derailler will not be moved counterclockwise but will remain in the position shown in FIG. 4 and the link 36 will compress the spring 38 since one end of the spring 41 bears against the projection 37 of the operating link 36 and the other end bears against the linkage 17. Since the spring 38 is compressed in the condition illustrated in FIG. 4, when the bicycle is moved and its wheels start to turn, thus unlocking the roller cage 19, the derailler will automatically shift to the correct position as the spring 38 causes the links 17 and 18 to rotate counterclockwise relative to FIG. 4 to the shifted position.

Thus, the invention prevents breakage and stretching of the control cable 42 of the bicycle when it is improperly shifted and assures that the derailler will be shifted to the commanded position after the wheels start to roll.

FIG. 6 illustrates a modification of the invention wherein the projection 37 which extends the portions 12a and 12b of member 12 is eliminated and the end 36a is formed into a U-shaped with portions 36b and 36c which extend through an opening formed in the link 17 and into the space between portion 12d and 12c of member 12. The inner end 68 of portion 36c engages the end 41 of spring 38 and the other end 39 of spring 38 rests against the link 17. Thus, when the operating linkage 36 is moved by the cable 42 the portion 36c and projection 68 will be moved to compress the spring 38.

FIG. 7 is a modification of the end of link 36 for attaching the cable 42 to the link. A pin 71 with an enlarged head is mounted on the end of link 36 and the cable passes around the pin 71 under the head 72 and over the projection 44 and behind the projection 73 to lock the cable 42 to the link.

FIG. 8 illustrated a further modification of the invention where instead of a shoulder rivet such as illustrated in FIG. 7 the member 36 is extruded to form a collar 81 around which the cable 42 can pass. The cable then passes under the projection 44 and behind the projection 73.

Bolts 22 and 23 are supported in bracket 21 and engage stop mechanism 85 to limit the end travel of the derailler.

FIG. 5 is a modified form of link 36 wherein a member 71 is attached to the link 36. Holes 70 and 73 are formed in member 71 and link 36 and a rivet 83 passes therethrough to join the parts together. An internally threaded cylindrical member 74 is attached to member 71 and receives a bolt 75 which clamps the cable 42 to member 71.

It is seen that this invention provides a novel derailler for a bicycle and although it has been described with respect to preferred embodiments it is not to be limited as changes and modifications may be made which are within the full intended scope as defined by the appended claims.

I claim as my invention:

1. A bicycle derailler having upper and lower main derailler members, a pair of links pivotally attached to said upper and lower main derailler members, an actuating lever pivotally attached to said lower main derailler member, a spring mounted between one of said links adjacent said lower main derailler member and said actuating lever to bias said actuating lever and an actuating cable attached to said actuating lever.

2. A bicycle derailler according to claim 1 wherein four pins pivotally attach said pair of links to said upper and lower main derailler members and said spring is a coil spring mounted about one of said pins with a first end that engages one of said links and a second end which engages said actuating lever.

3. A bicycle derailler according to claim 2 wherein said actuating lever has a projection which extends between said pair of links and said second end of said spring engages said projection.

4. A bicycle derailler according to claim 3 wherein said actuating link is U-shaped.

5. A bicycle derailler according to claim 3 wherein said actuating lever is pivotally supported by said one pin.

6. A bicycle derailler according to claim 1 wherein said actuating lever has a cable locking portion comprising an arcuate portion and at least one projection and said cable passes around said arcuate portion and under said one projection to lock said cable.

7. A bicycle derailler according to claim 6 wherein said actuating lever has a second projection adjacent said one projection and said cable passes under said second projection.

8. A bicycle derailler according to claim 7 wherein said arcuate portion is a button rivet.

9. A bicycle derailler according to claim 8 wherein said arcuate portion is an extruded coller formed from said actuating lever.

* * * * *